Figure 1:
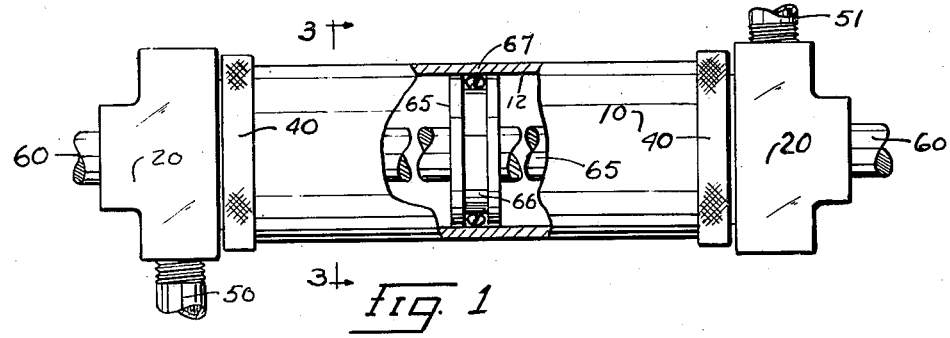

Aug. 30, 1949.    N. A. CHRISTENSEN    2,480,633
CYLINDER AND CYLINDER HEAD CONSTRUCTION
Filed Feb. 28, 1947                     2 Sheets-Sheet 1

INVENTOR.
NIELS A. CHRISTENSEN
BY
Bates, Teare, & McBean
ATTORNEYS

Aug. 30, 1949.   N. A. CHRISTENSEN   2,480,633
CYLINDER AND CYLINDER HEAD CONSTRUCTION
Filed Feb. 28, 1947   2 Sheets-Sheet 2
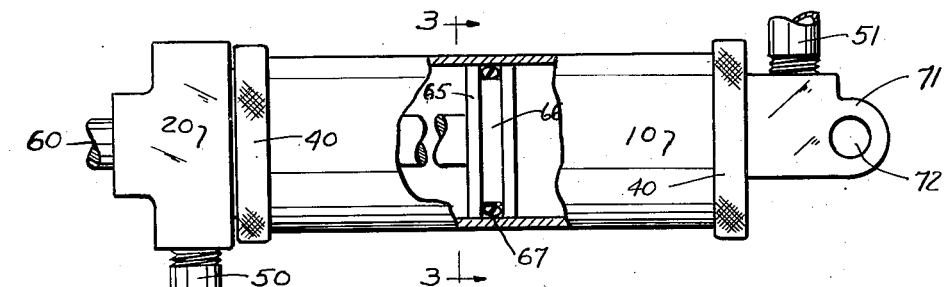
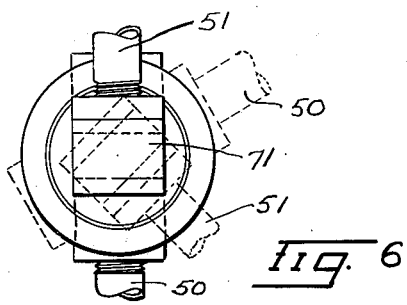
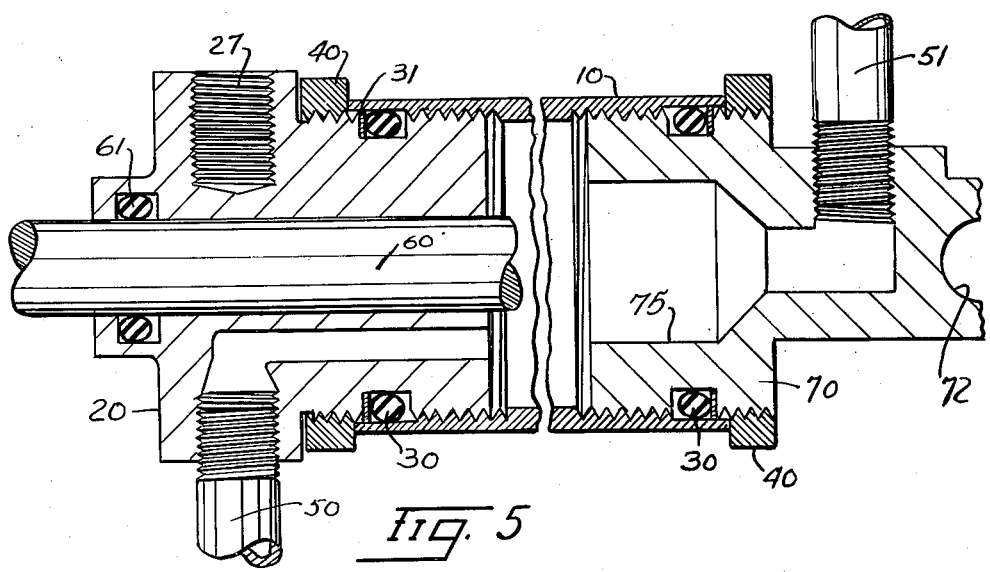
INVENTOR.
NIELS A. CHRISTENSEN
BY
Bates, Teare, & McBean
ATTORNEYS Patented Aug. 30, 1949

2,480,633

UNITED STATES PATENT OFFICE 2,480,633

CYLINDER AND CYLINDER HEAD CONSTRUCTION

Niels A. Christensen, South Euclid, Ohio

Application February 28, 1947, Serial No. 731,665

9 Claims. (Cl. 309—2)

This invention relates to a cylinder construction adapted to receive fluid under pressure from a control valve and thereby actuate a piston and piston rod which may operate to some extraneous mechanism. Such cylinders are used in various hydraulic installations, in industrial machinery and various power operated parts in aircraft.

One of the objects of my invention is to provide a cylinder construction wherein the two cylinder heads are adjustable relative to each other to enable a ready attachment to the pressure conduits and mounting fixtures connected therewith without requiring a specific location for such parts. More specifically, my invention enables the two cylinder heads to be adjusted radially with reference to each other so that the conduits and anchorage need not come from any specific direction and may accordingly be located as most convenient. Simplicity of the construction and economy in its manufacture are also features of my invention.

Two embodiments of the invention are illustrated in the drawings hereof with reference to use as a double-acting or single-acting cylinder, each of which is hereinafter fully described.

Figure 2:
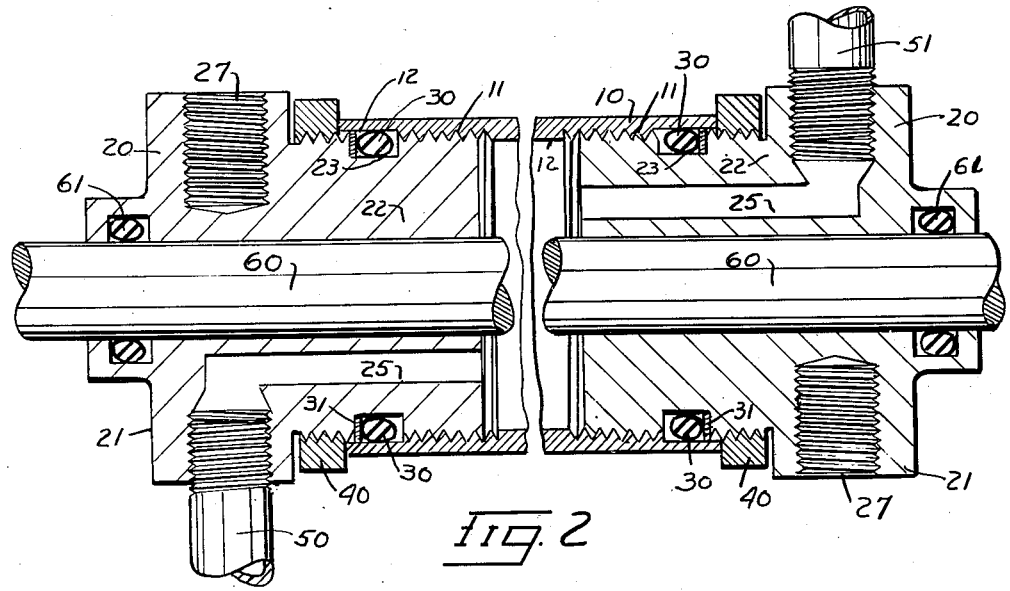
Figure 3:
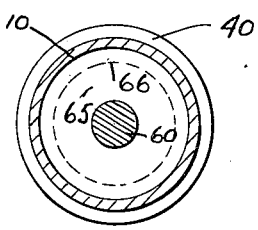

In the drawings, Fig. 1 is a side elevation partly broken out of a double-acting cylinder embodying my invention; Fig. 2 is an axial section of the cylinder on a larger scale intermediately broken away; Fig. 3 is a cross section on the line 3—3 of either Figs. 1 or 4; Fig. 4 is a side elevation intermediately broken out of a single-acting cylinder embodying the invention; Fig. 5 is an enlarged axial section of such cylinder, the intermediate portion being omitted; Fig. 6 is a right hand end view of the single-acting cylinder shown in Figs. 4 and 5, illustrating in broken lines in various other positions of the pressure conduits.

Referring first to Figs. 1 to 3, 10 designates a cylinder wall or body, and 20 either of two identical heads thereof. The cylinder wall in its general or intermediate region has a smooth interior, as shown at 12 in Figs. 1 and 2. Near each end the cylinder is provided with an internal thread 11 and between such thread and the adjacent end is a smooth cylindrical portion 12 of a diameter as great as the root diameter of the thread. The two heads 20 have enlarged external portions 21 which stand outside of the cylinder, and have cylindrical externally threaded bosses 22 which screw into the threaded portions of the cylinder 10.

The thread on each boss 22 is complementary to the thread 11 in the cylinder. This external thread is interrupted by an annular groove 23, in which is a toroidal packing ring 30 making a fluid-tight engagement between the base of the groove and the smooth interior portion 12 of the cylinder. A reinforcing split ring washer 31 may be interposed between each ring 30 and the outer radial wall of the associated groove to protect the packing ring from extruding due to internal pressure in the cylinder. The position of each cylinder head is locked by a jam nut 40 surrounding the cylinder head and threaded thereon and abutting the adjacent end of the cylinder.

It will be seen that the construction above described enables the cylinder heads to stand at any angular position desired, the packing insuring a fluid-tight connection with a cylinder wall and the jam nuts preventing displacement of the heads with reference to the cylinder.

In Fig. 1, I have shown a pair of power conduits 50 and 51 screwing into radial recesses in enlarged portions 21 of the two heads 20. Longitudinal passageways 25 lead from the inner ends of the pipes 50 and 51 to the cylinder space between the two heads.

Fig. 2 shows the pipe 50 leading upwardly to the head and the pipe 51 leading downwardly but it will be readily apparent either head may be positioned to receive a pipe coming from any direction. For convenience of a fixed mounting, I have shown a threaded socket 27 in each head, that is adapted to receive a bolt for fastening the head to any suitable support.

In Figs. 1 and 2 I have shown a piston rod 60 extending through the two cylinder heads and packed by toroidal rings 61 mounted in recesses in the respective heads. Mounted on the piston rod is a piston 65 coacting with the smooth portion of the cylinder wall. This piston is shown as having a circumferential groove 66 in which is mounted a toroidal packing ring 67, shown in section in Fig. 1.

In Figs. 4 to 6, I have illustrated the invention as applied to a single-acting cylinder. In this case the cylinder wall 10 and one of the heads 20 are the same as already described. The other head 70, while having some of the characteristics of the first-described head 20, differs therefrom in certain details. It has the externally threaded portion to screw into the cylinder and has a recess interrupting the thread to receive the toroidal packing 30 and also has a portion of the thread external of the cylinder and carrying the jam nut 40. Beyond the jam nut, however, the cylinder head 70 has an extension 71 which has a radial internally threaded opening to receive the pipe 51 for pressure fluid. In the interior of the head 70, is an axial conduit 75 leading to the piston area in the cylinder. The extension 71 may have a suitable opening 72 for pivotally supporting the unit, if desired, for swinging movement, in which case, the rigid fastening connection to a support is not used.

This second embodiment has the piston rod 60 extending only through the head 20, the piston rod being packed by a toroidal ring 61 and connected to a piston 65 having an annular groove 66 occupied by a toroidal ring 67, same as described with reference to the first embodiment.

This second embodiment like the first, allows the two heads of the cylinder to be adjusted slightly in or out of the cylinder wall and for either head to take any angular position desired with reference to the other head. Figs. 4 and 6 show the pressure conduits 50 and 51 extending from opposite directions. Fig. 6, however, illustrates in broken lines the pressure conduit 51 extending from a lower region diagonally upward and the pressure conduit 50 extending either from an upper region diagonally downward or from a lower region diagonally upward. Such showing is intended to indicate that either of the conduits may extend in any direction as desired, and as already stated the same applies to conduits 50 and 51 of Figs. 1 and 2.

It will be noticed that all of the toroidal packing rings employed are elliptical in direction lengthwise of the cylinder. Before the rings are put in place, however, they are truly circular in cross section. The grooves they occupy have a depth less than the cross sectional diameter of the unapplied ring and a length greater than the major axis of the cross-sectional ellipse when the ring is in place. The result is that the ring can gradually roll or turn on itself in its groove as the piston operates or as the heads are adjusted, which gives a kneading action to the ring increasing its life.

I claim:

1. A cylinder having a wall and a pair of heads, at least one of the heads having an external thread meshing with an internal thread in the cylinder wall, whereby it may be adjusted longitudinally and angularly, a packing between the exterior of the inserted portion of said adjustable head and the interior of the cylinder, there being a passageway through said adjustable head leading to the interior of the cylinder, whereby a conduit in any of various positions may be coupled to said head in communication with said passageway, a piston within the cylinder wall and a piston rod connected thereto and extending through one of the cylinder heads.

2. The combination of an internally threaded cylinder, a cylinder head having an externally threaded portion screwing into the thread of the cylinder, a packing between such externally threaded portion and the cylinder wall, a radial passageway into the head from the exterior, a longitudinal passageway in the head from the radial passageway to the space within the cylinder, and means for attaching a conduit in communication with said radial passageway.

3. The combination of a cylinder having a smooth interior in an intermediate location, and having threads adjacent its opposite ends, with smooth internal portions beyond the threads, a pair of cylinder heads having threads engaging those of the cylinder, packing between the heads and the last-mentioned smooth portions of the cylinder wall, a piston rod extending through one of the cylinder heads, a piston on the piston rod coacting with the first-mentioned smooth portion of the cylinder wall.

4. A cylinder having a wall and a pair of heads, at least one of the heads having an external thread meshing with an internal thread in the cylinder wall, whereby it may be adjusted longitudinally and angularly, a jam nut threaded on the exterior of the head and abutting the end of the cylinder wall, there being a passageway through said adjustable head leading to the interior of the cylinder, whereby a conduit in any of various positions may be coupled to said head in communication with said passageway, a piston within the cylinder wall and a piston rod connected thereto and extending through one of the cylinder heads.

5. The combination of a cylinder wall, a pair of heads therefor, one of the heads having an external thread connection meshing with an internal thread on the cylinder wall to enable it to be turned with reference thereto, a jam nut for locking the head in adjusted position, a radial passageway extending from the exterior into the head, a longitudinal passageway extending from the radial passageway to the interior of the cylinder, and means for attaching a pressure conduit to said head in communication with said passageway.

6. The combination of an internally threaded cylinder, an adjustable head therefor having a passageway through it and having an external thread occupying the thread of the cylinder, a jam nut on the external thread beyond the head of the cylinder adapted to butt against the said cylinder, the external thread of the head being intermediately interrupted by an annular groove, and a toroidal packing ring in said groove coacting with the cylinder.

7. The combination of a cylinder wall having an internal thread near one end with a smooth internal cylindrical space between the end and thread, a cylinder head having an externally threaded boss screwing into the cylinder, the thread on the boss being interrupted by an annular groove, a toroidal packing ring in said groove coacting with the smooth portion of the cylinder wall beyond the thread thereof, the thread on the boss extending to the exterior of the cylinder, a jam nut on said exterior portion of the thread abutting the end of the cylinder wall, a piston within the cylinder, a piston rod therefore extending through the head, an internally threaded radial passageway into the head adapted to receive an admission pipe and a longitudinal passageway communicating with the radial passageway and with the space for the cylinder beyond the head.

8. The combination of a cylinder having a smooth internal intermediate portion and smooth portions adjacent the ends with internal threads between said smooth portions, a pair of cylinder heads having an external thread screwing into the internal thread of the cylinder, each head having a groove adapted to register with the smooth end portion of the cylinder, packing in said grooves, a jam nut on each head threaded thereon and abutting the end of the cylinder, each head being provided with a radial entrance passageway communicating with a longitudinal passageway which leads to the cylinder space beyond the head, a piston rod passing through the two heads and a piston on the rod between the heads.

9. The combination of a cylinder having a smooth internal intermediate portion and smooth portions adjacent the ends with an internal thread between said smooth portions, a pair of cylinder heads having an external thread screwing into the internal thread of the cylinder, each piston head having a groove adapted to register with the smooth end portion of the cylinder, packing in said groove, a jam nut on each head threaded thereon and abutting the end of the cylinder, each head being provided with a radial entrance passageway communicating with a longitudinal passageway which leads to the cylinder space beyond the head, a piston rod passing through only one of the heads, a piston on the rod coacting with the intermediate space of the cylinder, the other head having a reduced extension provided with a radial passageway communicating with a longitudinal central passageway leading to the space within the cylinder between that head and the piston.

NIELS A. CHRISTENSEN.

REFERENCES CITED

The following references are of record in the file of this patent:

UNITED STATES PATENTS

| Number | Name | Date |
|---|---|---|
| 275,269 | Reid | Apr. 3, 1883 |
| 1,605,075 | Sheff | Nov. 2, 1926 |
| 1,770,528 | Maier | July 15, 1930 |
| 1,819,414 | Gruss | Aug. 18, 1931 |
| 1,859,436 | Durdin | May 24, 1932 |
| 2,227,838 | Main | Jan. 7, 1941 |
| 2,299,613 | Cleveland et al. | Oct. 20, 1942 |
| 2,299,695 | Greene | Oct. 20, 1942 |
| 2,349,170 | Jackman | May 16, 1944 |
| 2,389,849 | Gruss | Nov. 27, 1945 |

FOREIGN PATENTS

| Number | Country | Date |
|---|---|---|
| 8,736 | Great Britain | Oct. 19, 1908 |